United States Patent
Schulz

[11] Patent Number: 5,980,408
[45] Date of Patent: Nov. 9, 1999

[54] DAMPENED CHAIN WHEEL

[75] Inventor: Peter Schulz, Neufahrn, Germany

[73] Assignee: Joh. Winklhofer & Soehne GmbH Co. KG, Munich, Germany

[21] Appl. No.: 08/984,705

[22] Filed: Dec. 3, 1997

[30] Foreign Application Priority Data

Dec. 4, 1996 [DE] Germany ............... 296 21 083 U

[51] Int. Cl.$^6$ .................................................. F16H 55/06
[52] U.S. Cl. ......................... 474/161; 474/156; 474/151
[58] Field of Search ................................ 474/161, 152, 474/153, 150, 156; 74/443

[56] References Cited

U.S. PATENT DOCUMENTS

| | | |
|---|---|---|
| 1,808,369 | 6/1931 | Munroe . |
| 4,227,422 | 10/1980 | Kawashima et al. ............... 474/161 X |
| 4,261,214 | 4/1981 | Watanabe et al. .................... 474/161 X |
| 4,348,199 | 9/1982 | Oonuma et al. ..................... 474/161 X |
| 5,224,903 | 7/1993 | Langhof et al. ..................... 474/161 X |

FOREIGN PATENT DOCUMENTS

| | | |
|---|---|---|
| 0 021 839 | 1/1981 | European Pat. Off. . |
| 0 522 984 | 1/1993 | European Pat. Off. . |
| 1186486 | 8/1959 | France . |
| 2 325 804 | 4/1977 | France . |
| 821 303 | 11/1951 | Germany . |
| 57-190160 | 11/1982 | Japan . |
| PCT/US97/01494 | 7/1997 | WIPO . |

*Primary Examiner*—Tamara L. Graysay
*Assistant Examiner*—Marcus Charles
*Attorney, Agent, or Firm*—Seed and Berry LLP

[57] ABSTRACT

A chain wheel for a chain drive with a chain wheel comprising a damping rim of elastically deformable material at at least one axial side of said chain wheel, said damping rim including circumferentially alternating elevations, each with a peak portion and indentations, of which said elevations are intended for a radial overlap contact with straps or side bars of a chain engaging into teeth and tooth spaces of a toothing comprising in each tooth space inlet and exit profiles and an intermediate roll bed, the peak portion of each elevation being arranged within a circumferentially limited portion of said chain wheel that is defined by a reference plane containing the chain wheel axis and the center of curvature of said roll bed and by the extension of said entry profile in the tooth space.

7 Claims, 3 Drawing Sheets

DAMPENED CHAIN WHEEL

TECHNICAL FIELD

The present invention relates to a dampened chain wheel for a chain drive.

BACKGROUND OF THE INVENTION

In the case of chain wheels which are known from practical applications, each damping rim has a cylindrical circumferential extension, with the radial position of the circumference of the damping rim being adapted to the engagement depth of the chain into the chain wheel in such a manner that the straps or side bars of the chains deform the damping rims upon engagement of said chain so as to dampen the energy transmitted upon impact of the chain wheel for silencing purposes and for wear reduction. The damping rims are subject to relatively rapid wear so that the silencing of running noise and the reduction of wear can only be achieved over a short service life. Furthermore, it has been suggested in practice that the surface contour of the damping rim should be uneaten with a symmetrical profile and the profile elevations should be exactly aligned either with the centers of the tooth spaces or with the tooth crests. These measures are also not helpful to a damping action and wear reduction over a long service life. One, of the reasons are presumably abrupt deformations that are harmful to the elastic material of the damping rims, as well as circumferential displacements between the impact points of the chain rolls in the chain wheel and the overlap contacts between the straps and the profile elevations.

SUMMARY OF THE INVENTION

It is the object of the present invention to provide a chain wheel of the above-mentioned type with improved damping characteristics, reduced wear and a long service life of the damping rim.

In one embodiment the overlap contact between a respective strap or side bar and a respective elevation is achieved approximately below the area of the tooth space where noise and a wear-producing energy transmission take place. A circumferential displacement between the impact pulse of the chain roll and the reaction force of the deformed elevation and the strap which supports the chain rolls is avoided for achieving an optimum attenuation. Furthermore, there is no sudden deformation of the elevation, but an increasing and decreasing one which is extended in time and which leads to an unexpected prolongation of the service life of the damping rim. The two effects work together in the reduction of wear in the toothing and at each damping rim.

An optimum damping effect can achieved the peak portion of the elevation which is positioned relatively exactly below the impact point of the chain roll on the entry profile.

In an embodiment the asymmetrical shape of each elevation with a free deformation space and a defined deformation direction is particularly expedient because the deformation takes place over a period of time which is prolonged by the extension contour so that the deformation work for the damping rim is performed gently and with reduced power. This results in an unexpected increase in the service life of the damping rim. An excellent noise attenuation and reduced wear are ensured over the considerably prolonged service life of the damping rim.

In an embodiment the defined deformation direction extends approximately in a direction opposite to the rotational direction of the chain wheel. A rotational direction of the chain wheel which depends on the asymmetrical shape of the elevations of the damping rim is of importance to a long service life of the damping rim which is exploitable with respect to silencing and wear reduction, namely irrespective of whether the chain wheel or the chain performs the driving action. If the chain wheel is rotated in the "wrong" rotational direction, the service life within which a damping action is achieved with reduced wear may be shortened.

The shape of the circumference of the damping rim and the positioning of the elevations below the entry profiles is expedient in an alternate embodiment having tooth spaces which are symmetrical in mirror-image fashion, irrespective of whether these follow circular-arc sections or involutes.

In this embodiment, a particularly good damping action with a long service life of the damping rim and the chain wheel is obtained thanks to the combination of positioning the elevations below the entry profiles with the asymmetrical contour of extension of the elevations and with a tooth space shape which is asymmetrical relative to the reference plane. In the case of the asymmetrical tooth space shape the steeper entry profile leads to a reduced impact force and a weaker speed pulse, while the flatter exit profile permits a rapid and early release of the chain roll without any harmful contacts with the exit profile. The damping rim can be adapted in an optimum manner to parasitic force and speed pulses which are already reduced by the asymmetrical tooth space profile. There is a cooperation between the tooth space shape and the damping rim shape in such a manner that these two measures of design lead each to a noticeable noise and wear reduction and supplement one another not only additively, but even show a synergistic effect.

In this embodiment, the asymmetry of the tooth space profile can easily be illustrated by way of tangents laid at the turning points of the entry and exit profiles. The angle between the tangent at the turning point of the entry profile and the reference plane can be provided with only half the magnitude in comparison with the angle between the tangent at the turning point of the exit profile and the reference plane. Moreover, the asymmetrical tooth space shape determines a specific rotational direction of the chain wheel, irrespective of whether the chain wheel or the chain performs the driving action. It is also possible to use the chain wheel with a "wrong" rotational direction; however, the achievable damping effect and wear reduction might be smaller in such a case.

Favorable deformation conditions with a gentle deformation of the elevations can be achieved from an embodiment of the invention. A deformation which is very gentle at the beginning and has increasing and decreasing transitions and which is beneficial to the service life of the damping rim can be achieved with a relatively steep or optionally undercut deformation profile.

In an embodiment, the pressure profile and the deformation profile are matched with the tooth space profile.

The profile of the damping rim can be simple under manufacturing aspects.

In an embodiment, it is ensured that, even in the case of a maximum overlap contact between a strap or side bar of the chain and an elevation of the damping rim, stress conditions, such as undesired shear stresses, which could jeopardize the service life of the damping rim are avoided in the elastic material of the damping rim.

BRIEF DESCRIPTION OF THE DRAWINGS

Embodiments of the subject matter of the invention will now be explained with reference to the drawing, in which.

DESCRIPTION OF THE PREFERRED EMBODIMENTS

Figure 1:
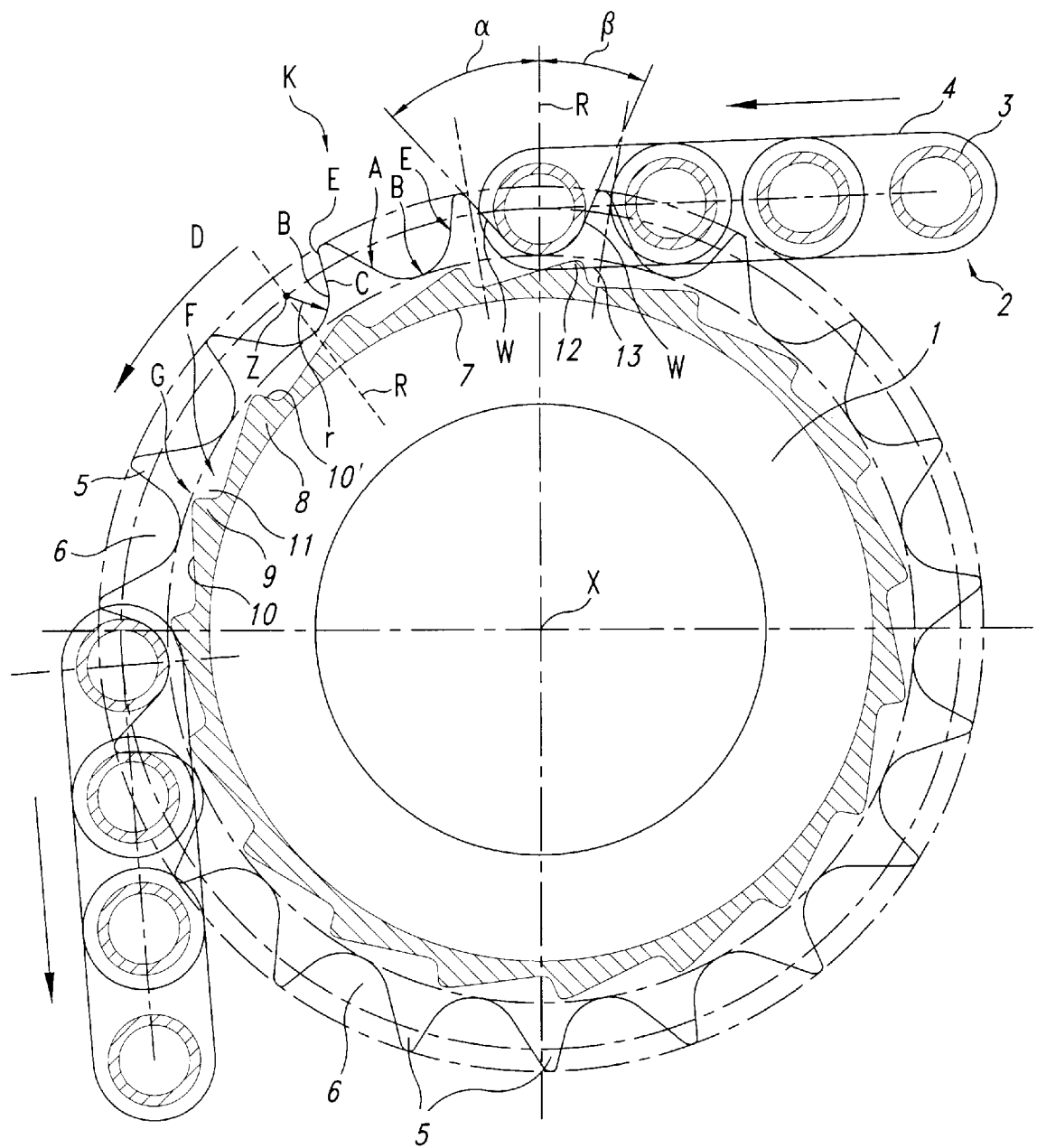
FIG. 1 is a sectional view showing part of a chain drive with a chain wheel and a chain engaging into the chain wheel.

A chain wheel 1 of a chain drive K which in FIG. 1 is rotatable about a chain wheel axis X with a fixed rotational direction D is engaged over approximately 90° by a chain 2, preferably a roller link chain, comprising chain rolls 3 and straps or side bars 4. The chain wheel 1 drives either the chain 2 or it is driven by the chain 2. Teeth 5 and tooth spaces 6 are arranged on the outer circumference of the chain wheel 1, with each tooth space 6 having an entry profile E, an exit profile A and a concave roll bed B connecting the profiles. The roll bed B has a geometrically defined center of curvature Z. A theoretical reference plane R which contains the chain wheel axis X and the center of curvature Z is used for geometrically defining the shape of the tooth space. In FIG. 1, top portion, each tooth space 6 is asymmetrical relative to the reference plane R. The entry profile E is steeper with respect to the reference plane R than the exit profile A, i.e., the profile angle β is smaller than the profile angle α. The angle α is suitably about twice as great as the angle β. Profiles A, E may be composed of circular-arc sections or they may follow involutes. In cases where the profiles are composed of circular-arc sections, there is a turning point W in each profile. The respective tangents T laid at the turning points W of a tooth space 6 enclose the angles α, β with the reference plane R. The asymmetrical shape of the tooth space is responsible for the predetermined rotational direction D and ensures that the chain rolls 3 enter at the steeper entry profiles E.

During operation, the asymmetrical tooth space shape has the effect upon an engaging action of the chain 2 that each chain roll 3 acts on the entry profile E at an impact point C and outputs a relatively small force and speed pulse which is normal to the surface due to the small angle β. Thanks to the steepness of the entry profile E, the pulse is relatively small (reduced impact noise and wear). Upon further rotation of the chain wheel 1, the chain roll 3 comes into full engagement with the roll bed R before leaving the roll bed B in the exit zone of the chain (FIG. 1, left side). In leaving the roll bed the chain roll 3 disengages rapidly and far away from the exit surface A which, in fact, extends at a considerably greater angle α relative to the reference plane R, i.e. has a considerably flatter extension, than the entry profile E. Since the exit profile A is rapidly released from the chain roll 3 within a small rotational range of the chain wheel 1, there will hardly be any noisy and wear-promoting impact contacts with the exit profile A under operationally produced chain vibrations, for example, influenced by a chain tensioner which acts on the chain.

Figure 5:
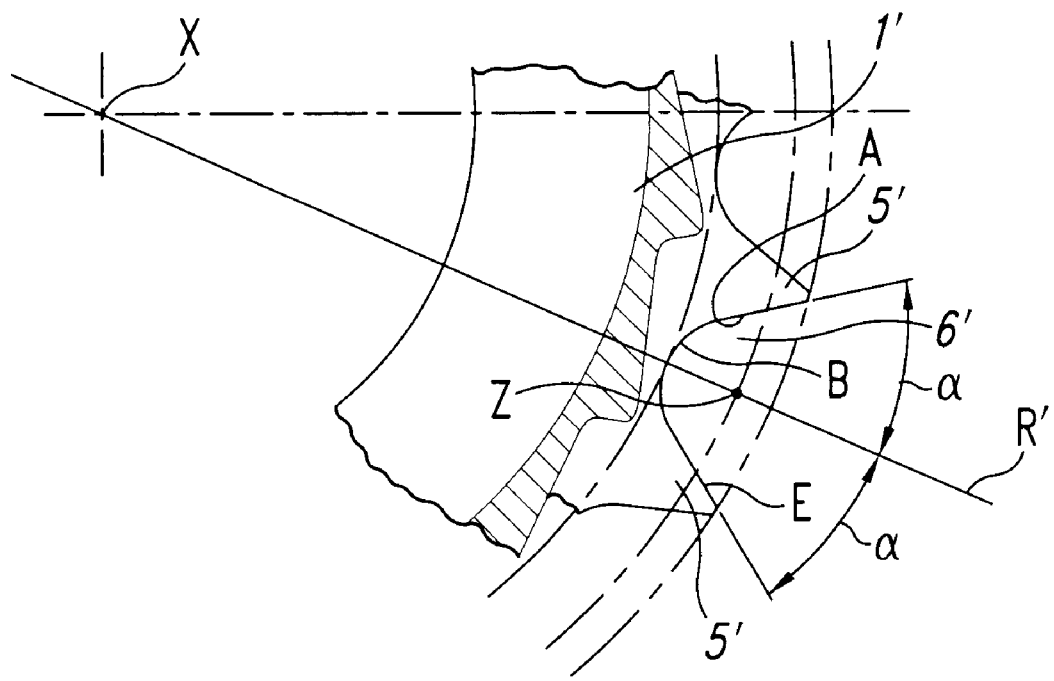
FIG. 5 is a sectional view showing part of a chain wheel according to another embodiment of the present invention.

A different embodiment of the chain wheel 1' is shown in FIG. 5. This chain wheel 1' has a tooth space shape that is symmetrical relative to the reference plane R', i.e. the entry profile E as well as the exit profile A are inclined under the same profile angle δ relative to the reference plane R'. The angles δ in the symmetrical tooth space 6' between the teeth 5' may be as great as the angle α of the asymmetrical tooth spaces 6 or greater than the angle α, (FIG. 1) or also as small as the angle β of the asymmetrical tooth space 6 or smaller than said angle β (FIG. 1) (for instance based on the maximum or minimum tooth space shape according to the German industrial standard DIN).

For further silencing and wear reduction, a damping rim 8 of an elastically deformable material (plastics or elastomer) is arranged in both embodiments (chain wheel 1 and 1', respectively) at each side of the teeth 5, 5', for example on a ring shoulder 7. The damping rims 8 use the straps 4 of the chain 2 for carrying purposes, they attenuate the pulses occurring at the impact points C of the entry profiles E, they dampen vibrations of the chain 2 in the exit zone and disengage the chain rolls 3 in the exit zone rapidly and far away from the exit profiles, in particular from the flatter exit profiles A. Each damping rim 8 has a regular sawtooth-like circumferential extension, so that a predetermined rotational direction D must be observed for the chain wheel 1 or 1' to achieve an optimum damping effect and wear reduction.

Two important aspects, which could also be employed singly, but are suitably implemented in combination, are important in each damping rim 8. The first aspect regards an optimum damping effect for impact pulses and vibrations of the chain in the exit zone. The second aspect increases the service life and durability of the damping rims 8.

The outer surface of each damping rim 8 (FIG. 1) alternately comprises elevations G and indentations F in a regular pattern. Each elevation G has a peak portion 9 to which a pressure profile 10 with a flat ascent extends from the indentation F which is forwardly positioned in the rotational direction D. A deformation profile 10' with a steep descent extends from the peak portion 9 into the indentation F which in the rotational direction D is at the rear, and into a free deformation space 11 which is provided there. Optionally, the deformation profile 10' has even an undercut (not shown). An overlap contact 12 which leads to a displacement of part of the mass 13 of the elevation G with the rotational direction D in an approximately opposite and defined deformation direction 14 takes place between each strap 4 (bottom edge of the strap 4) and the elevation G.

To optimize the damping effect according to the first aspect, the peak portions 9 of the elevations G are oriented from the axis X approximately radially towards the impact points C at the entry profiles E, namely irrespective of whether asymmetrical tooth spaces 6 or symmetrical tooth spaces 6' are provided for.

To increase the service life of the damping rims 8 according to the second aspect, an asymmetrical course of extension of the elevations G has been chosen with the free deformation space 11 and a defined deformation direction 14, namely irrespective of whether asymmetrical tooth spaces 6 or symmetrical tooth spaces 6' are provided for. As a result, the deformation in the overlap contact 12 is not abrupt, but gradual and takes place, at least in part, within the free deformation space 11 provided for this purpose.

According to FIG. 1, the overlap contact starts between a strap 4 and an elevation G suitably shortly before the chain roll 3, which is connected to the strap 4, contacts the entry profile E at the impact point C. The impact pulse is thereby attenuated. The gradually displaced mass 13 of the elevation G enters into the free deformation space 11 with the predetermined deformation direction 14. As soon as the chain roll 3 is in full engagement and is positioned in the roll bed R, the overlap contact 12 between the bottom side of the strap it and the elevation G is maximum. The overlap contact 12 will be maintained until the chain has passed into the exit zone (FIG. 1, left side). The chain rolls 3 will then disengage from the tooth spaces 6 (or 6'). The restoring force of the elevation(s) (G) that is (are) the last one(s) helps the chain 2 to detach from the chain wheel 1 (and 1', respectively).

Thanks to the flat exit profile A and the restoring pressure of the elevation G, the chain roll 3 is very rapidly removed from the exit profile A in the case of asymmetrical tooth spaces, so that vibrations of the chain will hardly lead to harmful sudden contacts between the chain roll 3 and the exit profile A. The overlap contact 12 which has so far existed helps to suppress or dampen such vibrations. The extent of the maximum overlap contact 12 is expediently adapted to the height difference between the peak portion 9 and the valley of the indentation F in such a manner that although the displaced mass 13 is increasingly supporting the strap in a direction opposite to the rotational direction D, the free deformation space 11 remains nevertheless available for the mass 13 at all times.

Figure 2:
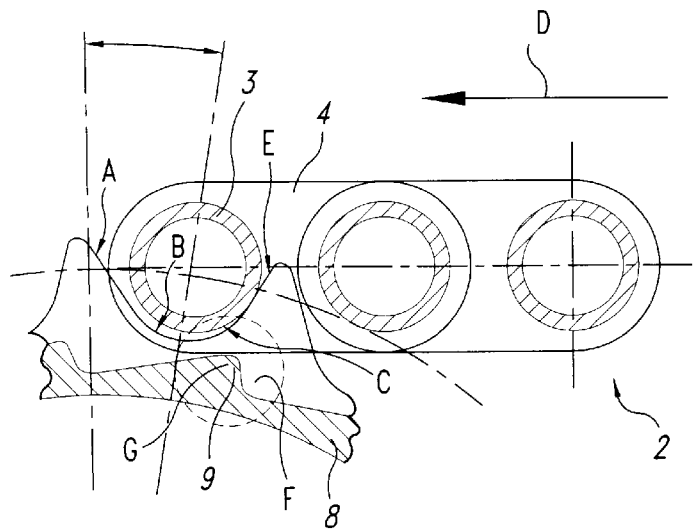
FIGS. 2, 3, 4 illustrate engagement conditions between the chain and the chain wheel of FIG. 1 in different rotational positions of the chain wheel.

FIG. 2 illustrates how in the entry zone of the chain 2 the chain roll 3 approaches the impact point C at the entry profile E and runs against the lower edge of the strap 4 in advance of the impact of the peak portion 9. This is a stage shortly before the stage shown in FIG. 1, top portion, has been reached in the case of an asymmetrical tooth space shape. This is analogously applicable to the chain wheel 1' with the symmetrical tooth space shape.

Figure 3:
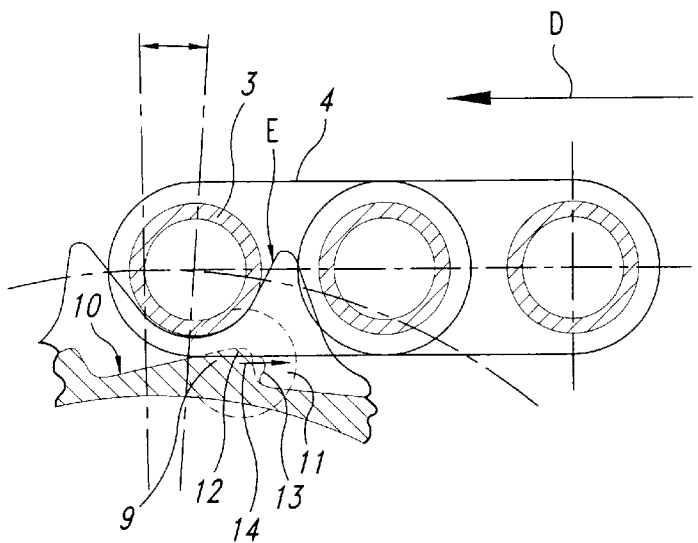

FIG. 3 illustrates a stage between the stage of FIG. 2 and the stage of FIG. 1, in which the chain roll 3 has not yet reached the roll bed B entirely, but the overlap contact 12 between the bottom edge of the strap 4 and the peak portion 9 has already effected a displacement of the mass 13 into the free deformation space 11, i.e. with a defined deformation direction 14 that is opposite to the rotational direction D. The strap 4 is more and more supported on the peak portion 9 in a direction opposite to the rotational direction D, but also in the rotational direction D at the front on the pressure profile 10.

Figure 4:
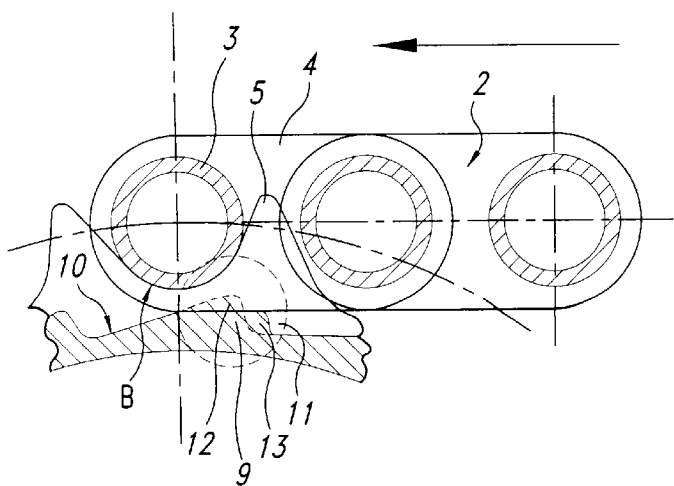

FIG. 4 illustrates a stage approximately in accordance with FIG. 1, top portion, in the case of which the chain roll 3 is fully seated in the roll bed B and the maximum overlap contact 12 has more or less been reached. The displaced mass 13 is located in the free deformation space 11 and now supports the strap 4 up to a point approximately below the crest of the tooth 5, while a significant part of the pressure profile 10 is also deformed.

Since according to experience the chain roll 3 according to FIG. 4 will be engaged to a reduced or insignificant degree upon further rotation of the chain wheel and will only be engaged again in the exit zone of the chain, the overlap contact between the strap 4 and the elevation G can slightly vary between the entry zone and the exit zone, before being cancelled when the chain roll 4 is entirely released in the exit zone, so that the elevation G assumes the original shape.

The exact contour of each elevation G may differ from the illustrated one, provided that it is ensured that the peak portion 9 is approximately aligned with the impact point of the chain roll 3 on the entry profile, and provided that it is also ensured that the deformation takes place in a defined deformation direction 14. The deformation profile 10' could be slightly flatter than shown or could have an even steeper descent or could even be provided with an undercut. The peak portion need not have a rounded contour by necessity; there could also be provided a flat portion with a tangential orientation or an inclined position, or a crest with an approximately concentric curvature relative to the chain wheel axis X. The width of the damping rim 8, when viewed in axial direction, should exceed the lateral projection of the straps 4 (inner and outer straps). If the damping rim 8 freely extends at the axial side facing away from the teeth 5 and 5', respectively, there will also be a certain deformation in this axial direction. Alternatively, the damping rim 8 could be arranged in a circumferential groove, with the damping rim 8 being supported, at least partly, in axial direction on the groove profile of the circumferential groove which is oriented away from the teeth 5. The hardness (Shore hardness) of the material of the damping rim 8 is adapted to the respective application. The material of the damping rim 8 is suitably resistant to moisture and/or lubricants.

I claim:

1. A chain wheel for a chain drive with at least one of a driving and a driven chain wheel, comprising a damping rim made of an elastically deformable material, which is positioned on at least one axial side of said chain wheel and which in the circumferential direction alternately comprises elevations with a peak portion and indentations, of which said elevations can approximately be brought into a radial overlap contact with straps or side bars of a chain engaging into teeth and tooth spaces of a toothing comprising a respective inlet and exit profile as well as an intermediate roll bed said chain having chain rolls for engagement into said toothing such that each chain roll starts engagement at a predetermined impact point of its associated entry profile, wherein the peak portion of each elevation is situated within a circumferentially limited portion of said chain wheel defined by a reference plane containing the chain wheel axis and a center of curvature of said roll bed and by the extension of said entry profile in the tooth space of said chain wheel such that said peak portion and an area of maximum overlap contact are situated with respect to said chain wheel axis approximately radially below the impact point of said chain roll on said entry profile, said elevation has an asymmetrical contour with a free deformation space adjacent to said peak portion, and the contacting peak portion under an overlapping contact with said strap is allowed to yield with a defined deformation direction into said free deformation space, and that said free deformation space, seen in a determined rotational operating direction of said chain wheel, is positioned behind said peak portion, and that said defined deformation direction is approximately opposite to said determined rotational direction of said chain wheel.

2. A chain wheel according to claim 1, wherein said entry and exit profiles are symmetrical in mirror-image fashion to said reference plane and follow circular-arc sections or involutes.

3. A chain wheel according to claim 1, wherein said entry and exit profiles which follow circular-arc sections or involutes are asymmetrical relative to said reference plane and are formed with an entry profile which is steeper than said exit profile.

4. A chain wheel according to claim 3, wherein said entry and exit profiles which follow circular-arc sections are each provided with a turning point, and that a first angle which is enclosed between a tangent at the turning point of said entry profile and said reference plane is smaller than a second angle which is enclosed between a tangent at the turning point of said exit profile and said reference plane, said first angle being about half the size of said second angle.

5. A chain wheel for a chain drive with at least one of a driving and a driven chain wheel, comprising a damping rim made of an elastically deformable material, which is positioned on at least one axial side of said chain wheel and which in the circumferential direction alternately comprises elevations with a peak portion and indentations, of which said elevations can approximately be brought into a radial overlap contact with straps or side bars of a chain engaging into teeth and tooth spaces of a toothing comprising a respective inlet and exit profile as well as an intermediate roll bed, said chain having chain rolls for engagement into said toothing such that each chain roll starts engagement at a predetermined impact point of its associated entry profile, wherein the peak portion of each elevation is situated within a circumferentially limited portion of said chain wheel defined by a reference plane containing the chain wheel axis and a center of curvature of said roll bed and by the extension of said entry profile in the tooth space of said chain wheel such that said peak portion and an area of maximum overlap contact are situated with respect to said chain wheel axis approximately radially below the impact point of said chain roll on said entry profile, said elevation has a pressure profile with a flat ascent from the one indentation to said peak portion, and a deformation profile with a steeper descent relative to said pressure profile from said peak portion into the subsequent deformation indentation in said indentation.

6. A chain wheel according to claim 2, wherein when viewed from said chain wheel axis said pressure profile is approximately oriented towards said roll bed and said deformation profile approximately towards the entry profile of a tooth space.

7. A chain wheel according to claim 6, wherein said damping rim with its outer circumference forms a regular sawtooth profile in which the flat pressure profiles are sent in a direction opposite to the determined rotational direction of said chain wheel.

* * * * *